US009718137B2

(12) United States Patent
Chang

(10) Patent No.: US 9,718,137 B2
(45) Date of Patent: Aug. 1, 2017

(54) DISPOSABLE CHAMFERING BLADE

(71) Applicant: Hsin-Tien Chang, Taichung (TW)

(72) Inventor: Hsin-Tien Chang, Taichung (TW)

( * ) Notice: Subject to any disclaimer, the term of this patent is extended or adjusted under 35 U.S.C. 154(b) by 0 days.

(21) Appl. No.: 14/697,907

(22) Filed: Apr. 28, 2015

(65) Prior Publication Data

US 2016/0107245 A1 Apr. 21, 2016

(30) Foreign Application Priority Data

Oct. 16, 2014 (TW) ............................. 103218303 U

(51) Int. Cl.

*B23B 51/10* (2006.01)
*B23C 3/12* (2006.01)
*B23C 5/10* (2006.01)
*B23C 5/20* (2006.01)
*B23B 27/14* (2006.01)

(52) U.S. Cl.

CPC .......... *B23B 51/102* (2013.01); *B23B 27/145* (2013.01); *B23B 51/10* (2013.01); *B23C 3/12* (2013.01); *B23C 5/109* (2013.01); *B23C 5/207* (2013.01); *B23B 51/105* (2013.01); *B23B 2220/04* (2013.01); *B23B 2251/50* (2013.01); *B23B 2265/08* (2013.01)

(58) Field of Classification Search

CPC ... B23B 51/101–51/103; B23B 51/105; B23B 51/10; B23B 51/0081; B23B 2251/50; B23B 2251/18; B23B 2265/08; Y10T 408/909

See application file for complete search history.

(56) References Cited

U.S. PATENT DOCUMENTS 1,499,818 A * 7/1924 Franconetti ............... B23C 5/12 29/10
2,188,624 A * 1/1940 Dantry .................... B23B 5/167 408/211
2,383,854 A * 8/1945 Gwinn, Jr. ............ B23B 51/104 408/112
3,495,483 A * 2/1970 Janik ....................... B23B 5/167 408/211
6,220,795 B1 * 4/2001 Matthews ............ B23B 27/145 407/113
7,390,152 B2 * 6/2008 Harif ......................... B23C 5/10 409/201
7,540,696 B1 * 6/2009 Houle ................ B23B 51/0063 408/211
2004/0001741 A1 * 1/2004 Mast ....................... B23B 51/00 408/233

(Continued)

FOREIGN PATENT DOCUMENTS

DE 4116114 A * 11/1992 ............. B23B 51/10
EP 2532461 A1 * 12/2012 ............. B23B 51/10

*Primary Examiner* — Sunil K Singh
*Assistant Examiner* — Ryan Rufo
(74) *Attorney, Agent, or Firm* — Rosenberg, Klein & Lee

(57) ABSTRACT

A disposable chamfering blade is provided with a mounting hole through which the disposable chamfering blade can be locked to a cutter body. One end of the disposable chamfering blade is provided with a conical cutter head whose conical periphery is circumferentially provided with a plurality of chip removing grooves. Each chip removing groove has a side face formed as a cutting edge such that the disposable chamfering blade is formed with a plurality of cutting edges for continuous cutting.

8 Claims, 6 Drawing Sheets

12 13 10 14 14 13

(56) References Cited

U.S. PATENT DOCUMENTS

2006/0029474 A1* 2/2006 Chang ................. B23B 51/0063 407/48
2008/0089750 A1* 4/2008 Chang .................. B23B 27/065 407/103
2009/0041554 A1* 2/2009 Liu ....................... B23B 51/101 408/225
2015/0196961 A1* 7/2015 Segev .................. B23B 51/048 408/201
2015/0209866 A1* 7/2015 Chang ..................... B23C 5/109 407/114

* cited by examiner

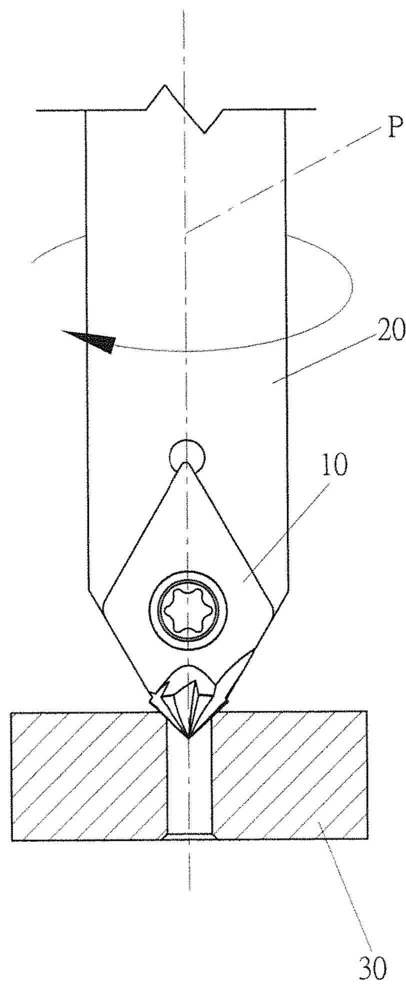
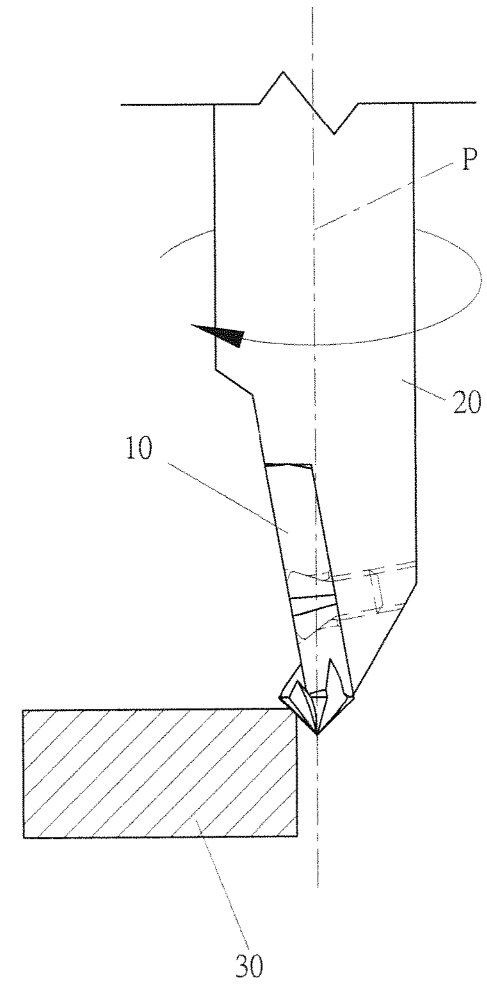
FIG. 6
FIG. 7

DISPOSABLE CHAMFERING BLADE

FIELD OF THE INVENTION

The present invention relates to a cutter for trimming the rough edges of a workpiece by chamfering. More particularly, the present invention relates to a disposable chamfering blade.

BACKGROUND OF THE INVENTION

A chamfering cutter is typically required for chamfering the rims of a hole drilled into a workpiece or for chamfering the edges of a workpiece, with a view to removing burrs at the rims or at the edges.

Referring to FIG. 9, a conventional chamfering cutter 5 includes a shaft 51 and a conical cutter head 52. The conical cutter head 52 is provided at one end of the shaft 51 and has at least one cutter groove 521. The cutter groove 521 is so formed that one of its sides forms a cutting edge 522 for cutting the rims of a hole in a workpiece to form chamfered rims or for cutting the edges of the workpiece to form chamfered edges.

Generally, the chamfering cutter 5 is made of high-speed steel (HSS) or other suitable cutter materials, and the cutter groove 521 is formed by grinding. As a result, formation of the cutter groove 521 is slow and costly, which in turn increases the production cost of the chamfering cutter 5. Moreover, if the cutting edge 522 of the chamfering cutter 5 breaks during operation, the entire cutter becomes useless and must be discarded. The conventional chamfering cutters, therefore, are not good for long-term use, and their consumable feature leads to a waste of material and high production cost.

Chamfering cutters with a disposable chamfering blade are also available. The disposable chamfering blade is connected to a cutter body, which usually has a large volume. More specifically, the disposable chamfering blade is provided on one side of the cutter body to form a single eccentric cutting edge. This arrangement, however, tends to give rise to eccentric wobbling or vibration of the blade, so the cutter body must be rotated at low speed. The single-cutting edge design also brings about a low chip removal rate. Consequently, the cutting speed and efficiency of such chamfering cutters are low.

SUMMARY OF THE INVENTION

The conventional HSS chamfering cutters are disadvantaged by high production cost resulting from the costly and time-consuming formation of the cutter grooves. Besides, the conventional HSS chamfering cutters are not good for long-term use and must be discarded once the cutting edges are broken, meaning a waste of material and high production cost follow.

The present invention provides a disposable chamfering blade. The disposable chamfering blade is provided with a mounting hole through which the disposable chamfering blade can be locked to a cutter body. A conical cutter head is provided at one end of the disposable chamfering blade, and the conical periphery of the conical cutter head is circumferentially provided with a plurality of chip removing grooves. Each of the chip removing grooves has a side face formed as a cutting edge such that the disposable chamfering blade is formed with a plurality of cutting edges for continuous cutting.

According to the present invention, chip removal rate can be increased manyfold due to the multiple cutting edges of the conical cutter head of the disposable chamfering blade. By changing the configuration of those conventional chamfering cutters designed for use with a disposable chamfering blade, the present invention reduces the time required for chamfering and thus contributes to increasing production capacity.

BRIEF DESCRIPTION OF THE DRAWINGS

The structure as well as a preferred mode of use and the advantages of the present invention will be best understood by referring to the following detailed description of an illustrative embodiment in conjunction with the accompanying drawings, in which:

FIG. 6 shows how the disposable chamfering blade in FIG. 1 is used to cut the rims of a hole in a workpiece to form chamfered rims;

FIG. 7 shows how the disposable chamfering blade in FIG. 1 is used to cut an edge of a workpiece to form a chamfered edge;

DETAILED DESCRIPTION OF THE INVENTION

Figure 1:
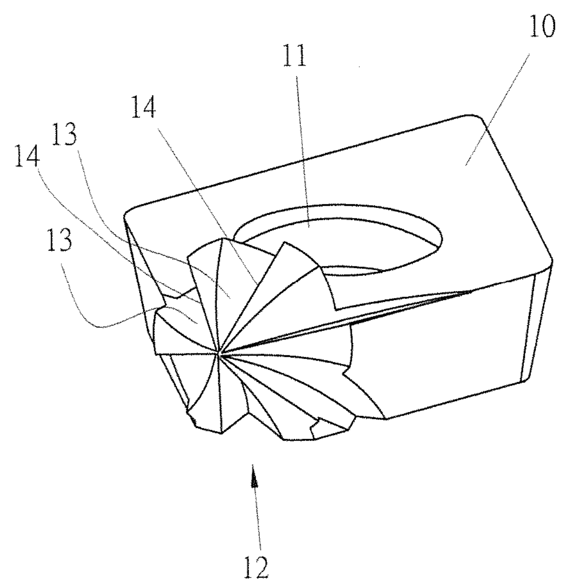
FIG. 1 is a perspective view of a disposable chamfering blade according to an embodiment of the present invention.
Figure 2:
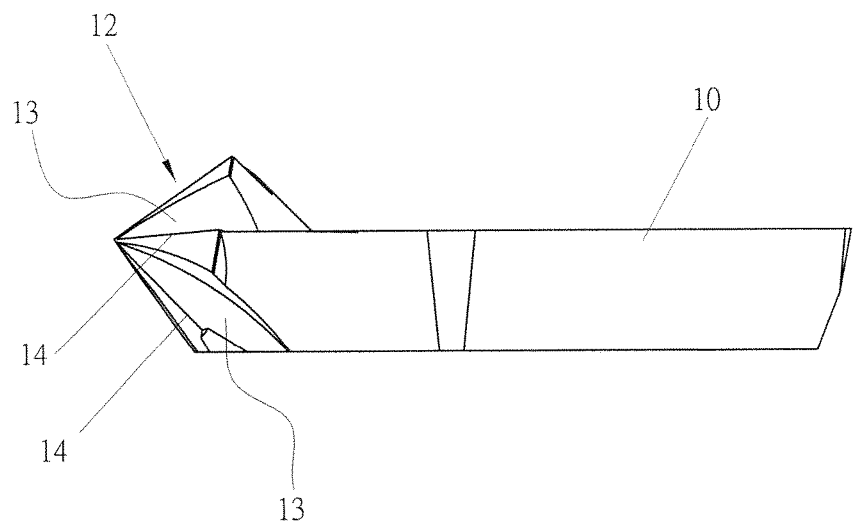
FIG. 2 is a side view of the disposable chamfering blade in FIG. 1.
Figure 3:
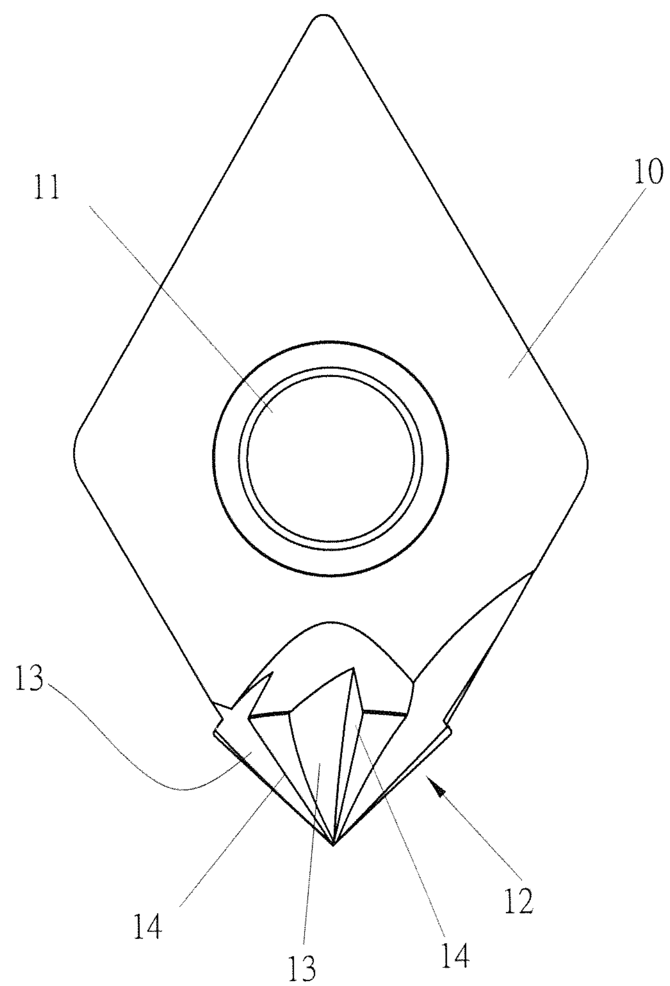
FIG. 3 is a front view of the disposable chamfering blade in FIG. 1.
Figure 5:
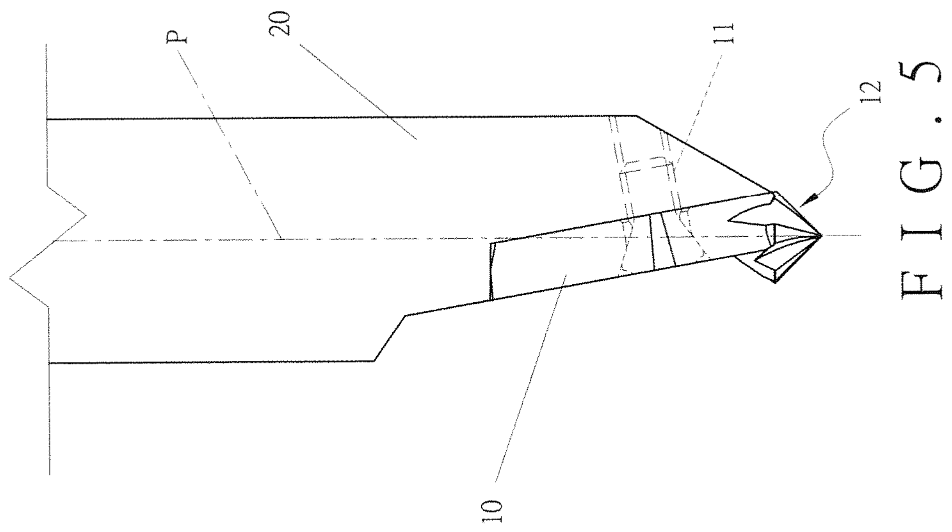
FIG. 5 is a side view of the assembly shown in FIG. 4.
Figure 4:
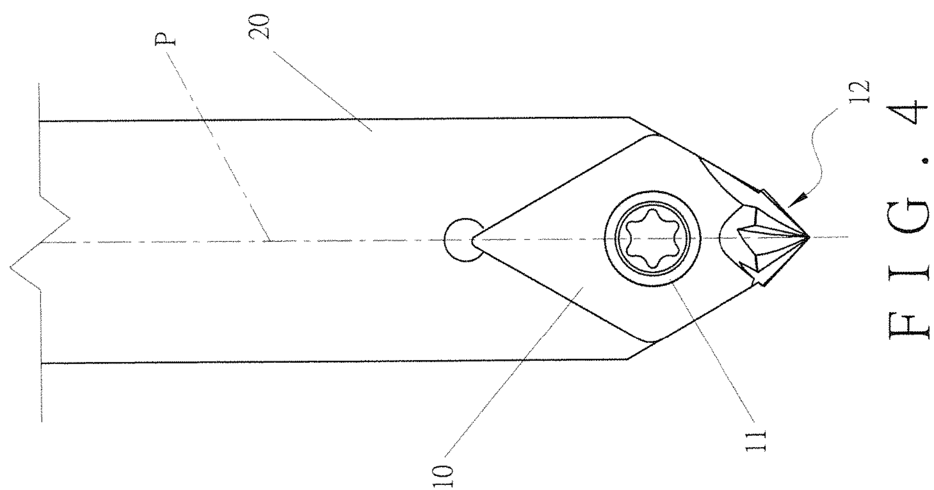
FIG. 4 is yet a front view of the disposable chamfering blade in FIG. 1, wherein the blade is locked to a cutter body.

Referring to FIGS. 1-3, a disposable chamfering blade 10 according to an embodiment of the present invention is provided with a mounting hole 11 through which the disposable chamfering blade 10 can be locked to a cutter body 20 (see FIGS. 4 and 5). A conical cutter head 12 is provided at one end of the disposable chamfering blade 10, and the conical periphery of the conical cutter head 12 is circumferentially provided with a plurality of chip removing grooves 13, wherein each of the chip removing grooves 13 has a side face formed as a cutting edge 14. Thus, the disposable chamfering blade 10 is formed with a plurality of cutting edges 14 for continuous cutting.

Please refer to FIGS. 4 and 5 respectively for a top view and a side view of the disposable chamfering blade 10 mounted to the cutter body 20. The conical cutter head 12 of the disposable chamfering blade 10 has multiple cutting edges 14, which is a pioneering design in the cutter industry. Moreover, as the cutter body 20 can be any of those for use with the conventional disposable carving tools, not only is it convenient for the user, but also the user is spared the cost for purchasing the cutter body 20. The disposable chamfering blade 10 is mounted to the cutter body 20 in a non-eccentric manner in which the disposable chamfering blade 10 lies on an axis P of the cutter body 20.

As shown in FIG. 6, the disposable chamfering blade 10 can be used to cut the rims of a hole in a workpiece 30 in order to form chamfered rims. Or, as shown in FIG. 7, the disposable chamfering blade 10 can be used to cut the edges of the workpiece 30 in order to form chamfered edges and thereby trim the burrs of the workpiece 30.

Figure 8:
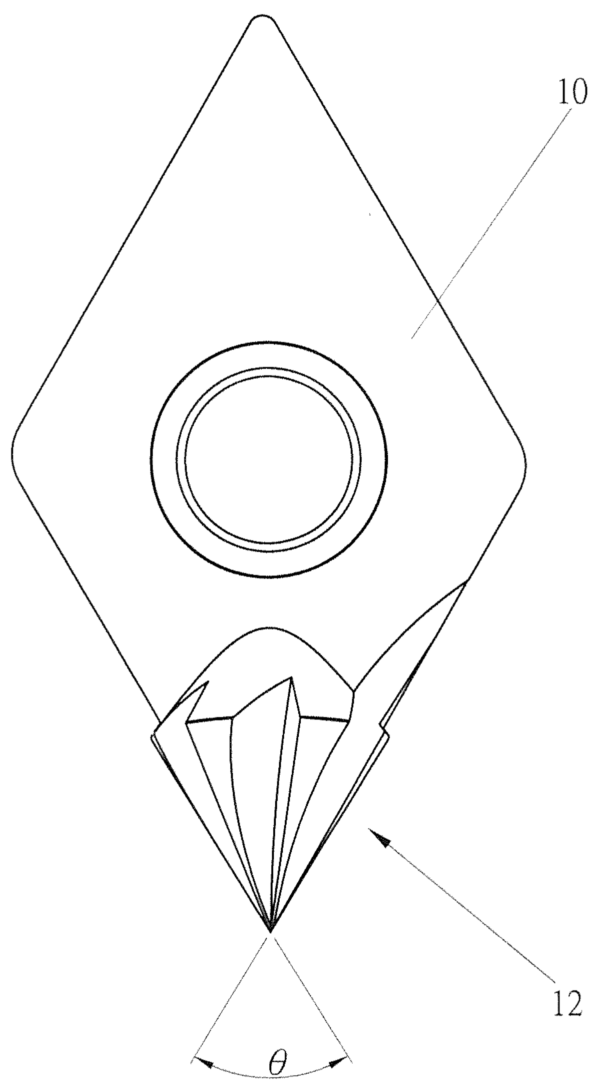
FIG. 8 shows that the taper of the conical cutter head of the disposable chamfering blade in an embodiment of the present invention can be changed to adapt to different working conditions.
Figure 9:
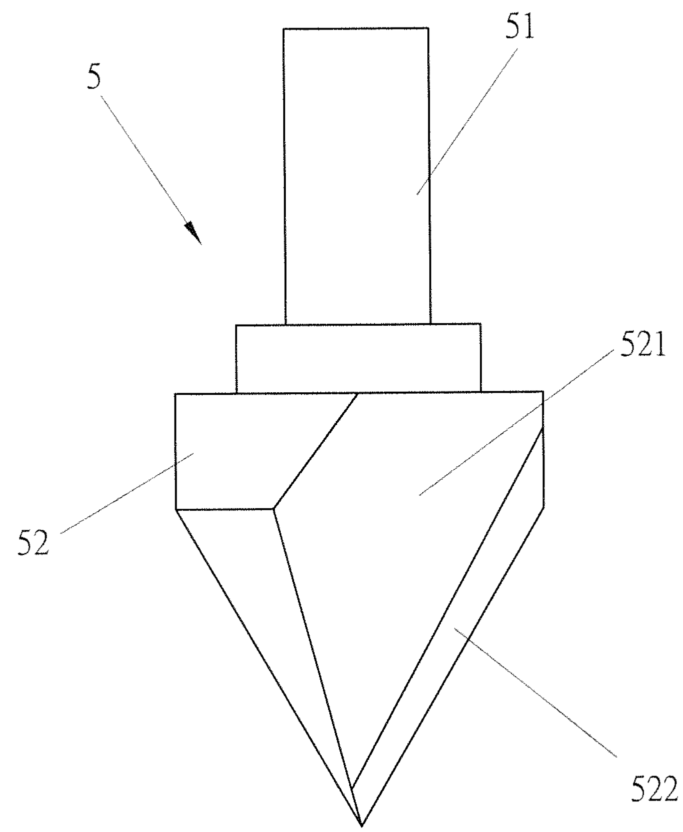
FIG. 9 shows a conventional chamfering cutter.

FIG. 8 shows the disposable chamfering blade 10 in a different configuration, in which the solid angle θ of the conical cutter head 12 has been changed to suit a different working condition.

The disposable chamfering blade 10 can be detached from the cutter body 20 for replacement. Hence, should the disposable chamfering blade 10 become dull or damaged, it can be rapidly replaced by a new one while the cutter body 20 remains in service. This particular feature of the present invention helps the user to reduce cost. Furthermore, as the cutter body 20 has a very simple structure, and the disposable chamfering blade 10 is so mounted that it lies on the axis P of the cutter body 20, the disposable chamfering blade 10 will not wobble eccentrically or vibrate when the cutter body 20 rotates at high speed. Also, the multiple cutting edges 14 on the disposable chamfering blade 10 can increase working speed by 2~4 times and thus effectively enhance work efficiency.

According to the above, the present invention is different from the conventional chamfering cutters which are equipped with a disposable chamfering blade having only one cutting edge or which are made of high-speed steel or other cutter materials. The present invention can reduce production cost, increase chip removal rate manyfold, shorten the time required for chamfering, and thereby raise production capacity.

The embodiment described above is but one preferred embodiment of the present invention in industrial application. All equivalent changes made according to the appended claims fall within the scope of the present invention.

The invention claimed is:

1. A disposable chamfering blade, comprising:

a blade body having a top side, a bottom side and a mounting hole formed through the blade body between the top and bottom sides for locking the blade body to a cutter body; and a conical cutter head provided at a longitudinal end of the blade body, wherein the conical cutter head has a conical periphery circumferentially provided with more than three chip removing grooves, and each of the chip removing grooves has a side face formed as a cutting edge such that the disposable chamfering blade is formed with a plurality of said cutting edges, and wherein the conical cutter head partially extends beyond an outer surface of the blade body such that it is asymmetrically disposed relative to a center plane between the top side and the bottom side.

2. A chamfering cutter, comprising:

a cutter body having an axis; and a disposable chamfering blade including:

a blade body having a top side, a bottom side and a mounting hole formed through the blade body between the top and bottom sides for locking the blade body to the cutter body such that the disposable chamfering blade lies on the axis; and a conical cutter head provided at a longitudinal end of the blade body, wherein the conical cutter head has a conical periphery circumferentially provided with more than three chip removing grooves, and each of the chip removing grooves has a side face formed as a cutting edge such that the disposable chamfering blade is formed with a plurality of said cutting edges, and wherein the conical cutter head partially extends beyond an outer surface of the blade body such that it is asymmetrically disposed relative to a center plane between the top side and the bottom side.

3. The disposable chamfering blade of claim 1, wherein an included angle between two adjacent cutting edges is an acute angle.

4. The chamfering cutter of claim 2, wherein an included angle between two adjacent cutting edges is an acute angle.

5. The disposable chamfering blade of claim 1, wherein the conical cutter head partially extends beyond the top side of the blade body.

6. The disposable chamfering blade of claim 1, wherein the conical cutter head has an apex at a distal end thereof and a plane defined by the top side of the blade body aligns with the apex.

7. The chamfering cutter of claim 2, wherein the portion of the conical cutter head partially extends beyond the top side of the blade body.

8. The chamfering cutter of claim 2, wherein the conical cutter head has an apex at a distal end thereof and a plane defined by the the top side of the blade body aligns with the apex.

* * * * *